United States Patent [19]

Bogwicz et al.

[11] Patent Number: 5,689,168
[45] Date of Patent: Nov. 18, 1997

[54] CONTROL CIRCUIT FOR TWO SPEED MOTORS

[75] Inventors: Robert R. Bogwicz, Rochester; John E. Durkee, Wayland; Jason S. Anderson, Rochester, all of N.Y.

[73] Assignee: Therm-O-Disc, Incorporated, Mansfield, Ohio

[21] Appl. No.: 741,567

[22] Filed: Oct. 31, 1996

[51] Int. Cl.$^6$ ............................................. H02P 5/40
[52] U.S. Cl. .......................... 318/772; 318/779; 318/786
[58] Field of Search ............................ 318/727, 767, 318/772, 778, 779, 781, 785, 786

[56] References Cited

U.S. PATENT DOCUMENTS

| | | |
|---|---|---|
| 3,414,789 | 12/1968 | Prouty . |
| 3,740,631 | 6/1973 | Fricker et al. . |
| 4,047,082 | 9/1977 | Scheuer et al. . |
| 4,254,343 | 3/1981 | Miller .................................. 318/778 X |
| 4,375,613 | 3/1983 | Fuller et al. . |
| 4,443,749 | 4/1984 | Douthart et al. ........................ 318/774 |
| 4,453,118 | 6/1984 | Phillips et al. ........................ 318/779 |
| 4,467,257 | 8/1984 | Douthart et al. ........................ 318/774 |
| 4,605,888 | 8/1986 | Kim . |
| 4,622,506 | 11/1986 | Shemanske et al. .................... 318/786 |
| 4,623,829 | 11/1986 | Smith et al. ........................... 318/793 |
| 4,658,195 | 4/1987 | Min ...................................... 318/786 |
| 4,804,901 | 2/1989 | Pertessis et al. ...................... 318/786 |

*Primary Examiner*—Bentsu Ro
*Attorney, Agent, or Firm*—Jones,Day,Reavis & Pogue

[57] ABSTRACT

A control circuit for a two speed electric motor includes high and low speed electronic switches. The high speed electronic switch is biased off when the low speed electronic switch is biased on. The low speed run winding of the motor is activatable only through the low speed electronic switch. The high speed run winding of the motor is activatable either directly through a high speed setting of a speed selector switch or through the high speed electronic switch in a low speed setting of the speed selector switch. Upon activation of the motor start winding, the low speed electronic switch is off and the high speed electronic switch is on.

10 Claims, 4 Drawing Sheets

CONTROL CIRCUIT FOR TWO SPEED MOTORS

BACKGROUND OF THE INVENTION

This application relates to the art of control circuits and, more particularly, to control circuits for electric motors. The invention is particularly applicable for use with a capacitor start two speed motor and will be described with specific reference thereto. However, it will be appreciated that certain features of the invention have broader aspects and can be used in other applications.

A motor start winding is activated to start a motor and is deactivated once the motor is up to speed. If the motor speed decreases to a predetermined threshold point, the start winding is reactivated until the motor is back up to the proper speed. In motors having centrifugal switches for activating and deactivating the start winding, the reduced motor speed at which the start winding is reactivated is the same regardless of whether the motor is running on the low speed winding or the high speed winding. It would be desirable to have a control arrangement for reactivating the start winding at different reactivating speeds depending upon whether the motor is running on its high speed run winding or on its low speed run winding.

When a motor is running on its low speed run winding and the start winding is reactivated, it is desirable to deactivate the low speed run winding and activate the high speed run winding until the motor is again up to speed. Many arrangements have used electro-mechanical relays to perform these control functions. It would be desirable to have an electronic control for performing all of the control functions of the type described.

SUMMARY OF THE INVENTION

The improved electronic switching arrangements of the present application are used in a motor control circuit that monitors a reference value correlated to motor power supply voltage and a sensed value correlated to motor current. The two values are compared by a comparator that changes states to activate and deactivate the motor start winding according to whether the sensed value is higher or lower than the reference value.

A motor control circuit includes a low speed electronic switch in series with a low speed run winding of a motor, a high speed electronic switch in series with a high speed run winding of the motor and an electronic start switch in series with the motor start winding.

In a preferred arrangement, the low speed run winding is activatable only through the low speed electronic switch. The high speed run winding is activatable either through the high speed electronic switch or directly through a speed selector switch. When the low speed electronic switch is biased on, the high speed electronic switch is biased off and the speed selector switch is in a position for activating only the low speed run winding.

When the start winding is reactivated while the motor is running on its low speed run winding, the low speed electronic switch is biased off and the high speed electronic switch is biased on. The high speed run winding is then activated through the high speed electronic switch and the low speed setting of the speed selector switch.

A detector is provided for detecting whether the motor is running on its low speed run winding to provide different reactivating motor speeds for the start winding depending upon whether the motor is running on its high speed run winding or on its low speed run winding.

It is a principal object of the present invention to provide a control circuit having electronic switches for activating and deactivating motor windings.

It is another object of the invention to provide a control circuit having electronic switches for reactivating a motor start winding at different reduced motor speeds depending upon whether the motor is running on its high speed run winding or on its low speed run winding.

It is a further object of the invention to provide a control circuit having electronic switches for deactivating a low speed run winding and activating a high speed run winding when the motor start winding is reactivated while the motor is running on the low speed run winding.

DESCRIPTION OF A PREFERRED EMBODIMENT

Figure 1A:
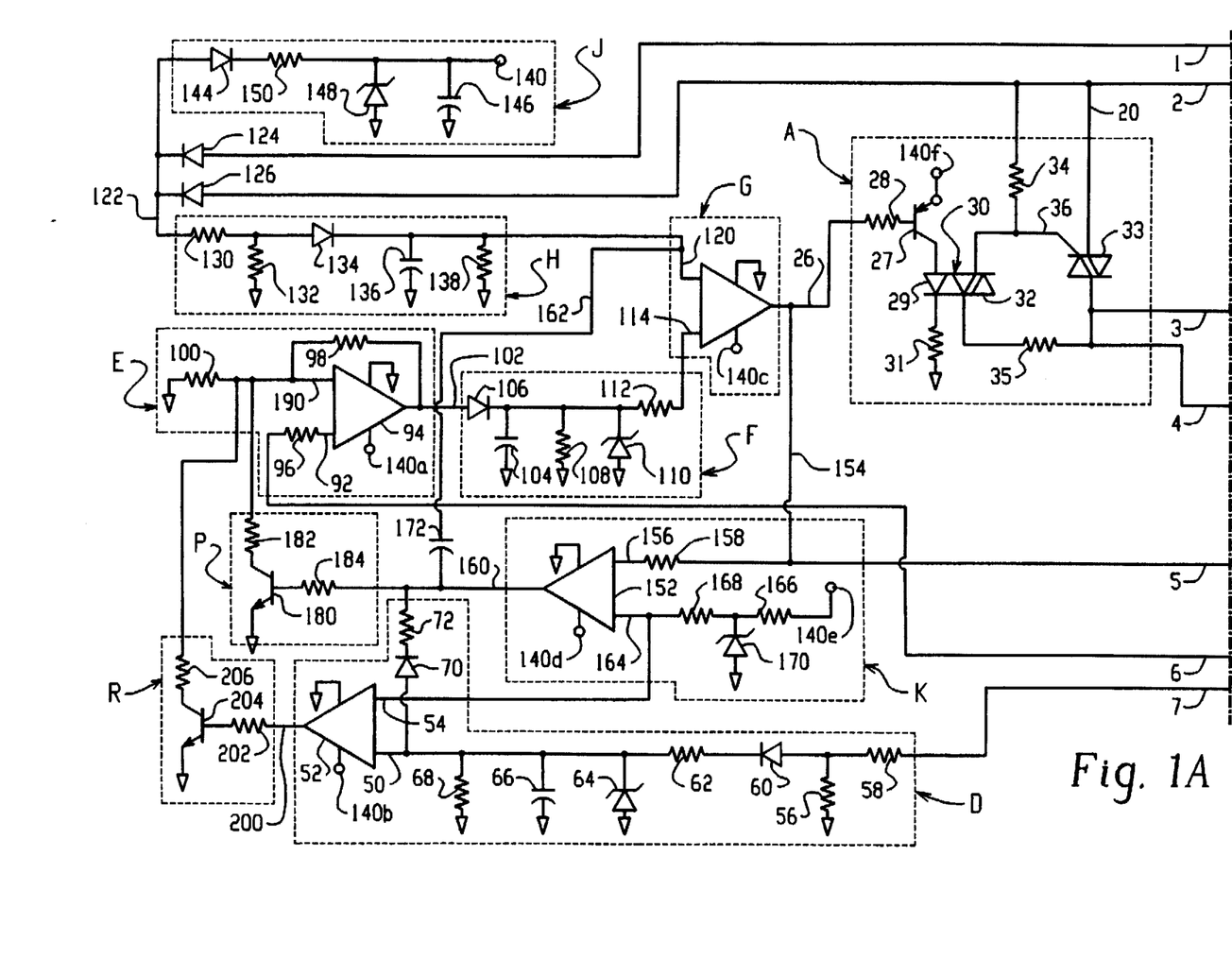
FIGS. 1A and 1B are a schematic illustration of a control circuit in accordance with the present application.
Figure 1B:
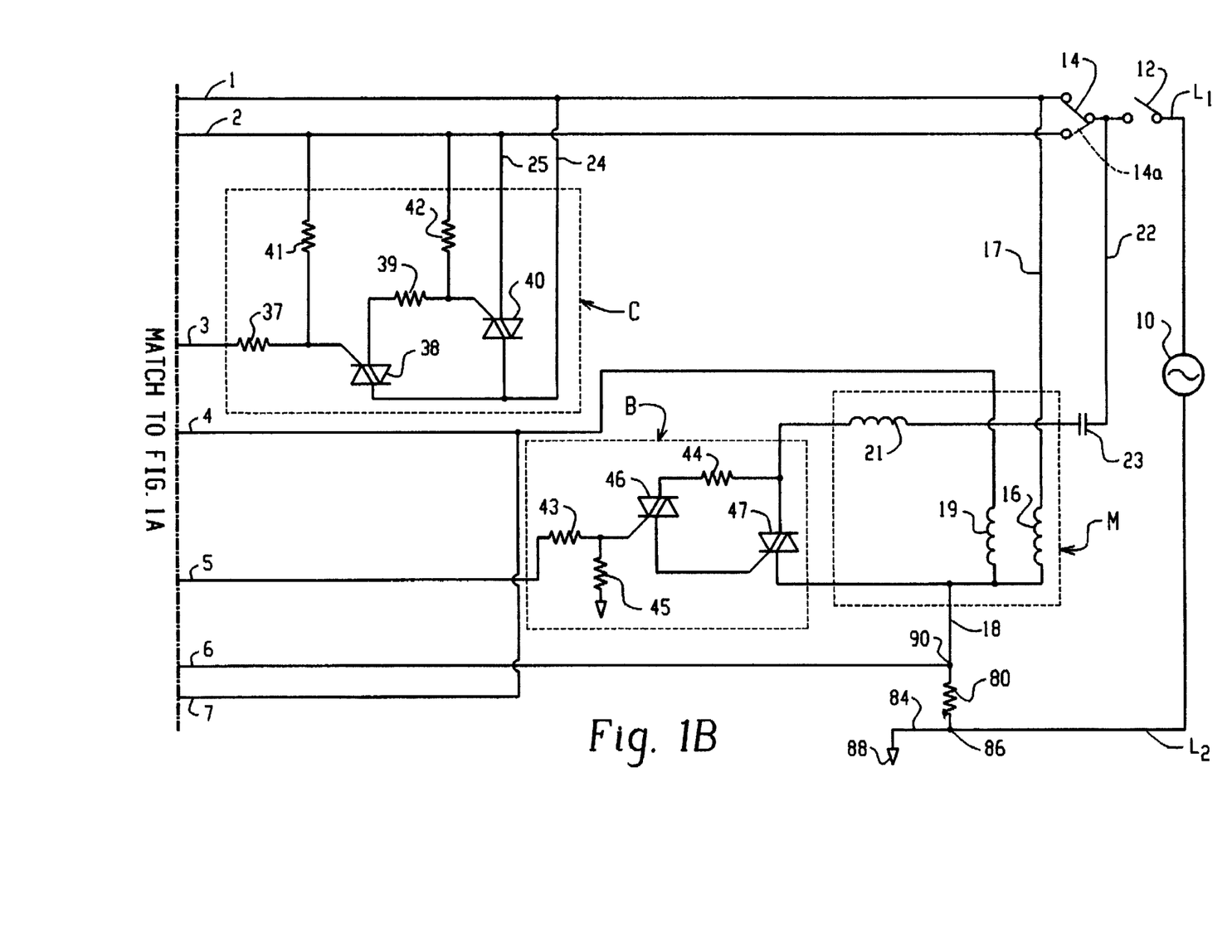

Referring now to the drawing, wherein the showings are for purposes of illustrating a preferred embodiment of the invention only and not for purposes of limiting same, numerals 1–7 identify the circuit lines that are interrupted at the right side of FIG. 1A to provide a reference for a continuation of the same lines that are identified by the same numbers 1–7 at the left side of FIG. 1B.

FIGS. 1A and 1B show a motor M connected across lines L1 and L2 of an alternating current power supply 10 through a main switch 12 and a speed selector switch having a high speed position 14 and a low speed position 14a.

Motor M includes a high speed run winding 16 connected across lines 1 and L2 by lines 17, 18. A low speed run winding 19 in series with a low speed electronic switch A is connected across lines 2 and L2 through lines 4, 18 and 20.

A start winding 21 in series with an electronic start switch B is connected across lines L1 and L2 by lines 18 and 22. A capacitor 23 in series with start winding 21 provides a phase displacement of approximately 90° between the start and run winding currents.

A high speed electronic switch C is connected to low speed electronic switch A by line 3. Lines 24 and 25 connect high speed electronic switch C to lines 1 and 2.

When the output of comparator G on line 26 goes low, pnp transistor 27 in series with a current limiting resistor 28 is turned on and supplies current to a photo diode 29 of an opto-isolator 30. Pnp transistor 27 inverts the output of comparator G to achieve proper operation of the circuit. Energization of photo diode 29 turns on triac portion 32 of opto-isolator 30 which turns on triac 33. Low speed winding 19 is then activated through triac 33 from line 2 to line 20, triac 33, line 4 and line 18. A current limiting resistor 31 is connected with photo diode 29. Resistors 34 and 35 limit the gate current into triac 33 and prevent false triggering of triac 33.

Opto-isolator 30 is used as a voltage isolator and translator between comparator G and triac 33 because the output of comparator G on line 26 and the input to triac 33 on line 36 are at incompatible electrical potentials.

Low speed electronic switch A is connected by line 3 through a current limiting resistor 37 to triac 38 of high speed electronic switch C. Triac 38 is connected through current limiting resistor 39 to high current triac 40. Current limiting resistors 41 and 42 cooperate with current limiting resistors 37 and 39 for limiting current to triacs 38 and 40, and help to prevent false triggering.

When low speed electronic switch A is on, the current through triac 33 to triac 38 on line 3 forces triac 38 to its off state. Therefore, high speed electronic switch C is always off when low speed electronic switch A is on. When low speed electronic switch A is off, high speed electronic switch C is always on.

With the speed selector switch in low speed position 14a, motor M is running on low speed run winding 19 through electronic switch A and the output of comparator G is low. If the motor slows down to a start winding reactivation speed, the output of comparator G on line 26 goes high and turns transistor 27 off to deactivate low speed electronic switch A which in turn deactivates low speed run winding 19. At the same time, high speed electronic switch C turns on because there is no longer a current on line 3 forcing triac 38 to its off state. Therefore, high speed winding 16 is connected in series with high speed electronic switch C through low speed switch setting 14a of the speed selector switch, line 2, line 25, triac 40, line 24, line 1 and line 17. Both start winding 21 and high speed run winding 16 are then active for accelerating motor M back up to the proper speed. Once the motor is back up to speed, the output of comparator G on line 26 again goes low to turn on low speed electronic switch A, and turn off electronic start switch B and high speed electronic switch C. The motor then returns to running on low speed run winding 19.

Electronic start switch B includes current limiting resistors 43, 44 and 45 that also help prevent false triggering of logic triac 46 and high current snubberless triac 47. Electronic start switch B is connected with output line 26 of comparator G by lines 5 and 154. When the output of comparator G on line 26 is low, electronic start switch B is off. When the output of comparator G on line 26 goes high, logic triac 46 of electronic start switch B turns on to also turn on high current snubberless triac 47. Start winding 21 is then activated through line 22, triac 47 and line 18.

High speed electronic switch C is connected in series with high speed run winding 16 only when the speed selector switch is in its low speed setting 14a. The circuit through high speed electronic switch C to high speed run winding 16 is interrupted when the speed selector switch is in high speed position 14 because line 2 is disconnected from line L1.

With the speed selector switch in its high speed position 14, high speed run winding 16 is directly connected across lines 1 and L2 through lines 17 and 18. Thus, there are two alternative paths for activating high speed run winding 16. Low speed run winding 19 and low speed electronic switch A are always deactivated when electronic start switch B and start winding 21 are activated.

When the speed selector switch is in solid line high speed position 14 connecting line L1 to line 1 for operating motor M on high speed run winding 16 through line 17, the control circuit turns electronic switch B on and off to activate and deactivate start winding 42 for maintaining proper motor speed. Electronic switch A is inoperative under these circumstances because line 2 is open circuited with the speed selector switch in high speed position 14. High speed electronic switch C is likewise inoperative because of open line 2.

The control circuit of the present application reactivates start winding 21 at different reduced motor speeds depending upon whether the motor is running on high speed run winding 16 through high speed position 14 of the speed selector switch or on low speed run winding 19 through low speed position 14a of the speed selector switch. This is accomplished in part by providing a low speed run winding detector D for determining whether low speed run winding 19 is active.

Low speed run winding detector D is connected by line 7 to line 4 between low speed electronic switch A and low speed run winding 19. When low speed electronic switch A is turned on and a voltage greater than 90 volts ac is present at the connection of line 7 to line 4, the resulting dc voltage provided by detector D at positive input 50 to comparator 52 exceeds the voltage at negative input 54 to comparator 52, and the output of comparator 52 goes high. This adjusts the circuit for reactivating the start winding at a lower motor speed than when motor M is running on its high speed run winding. This aspect of the control circuit will be described in more detail as the description proceeds.

Low speed run winding detector D includes resistors 56, 58 that form a voltage divider for reducing the magnitude of the line voltage to a certain desired value. Diode 60 rectifies line voltage into a positive pulsating dc voltage and is in series with a current limiting resistor 62. A zener diode 64 clamps the desired dc voltage value. Capacitor 66 filters the positive pulsating voltage into a steady dc voltage, and resistor 68 provides a controlled discharge path for filter capacitor 66. Diode 70 and resistor 72 provide a path for rapid discharge of capacitor 66 when low speed electronic switch A is turned off.

Figure 2:
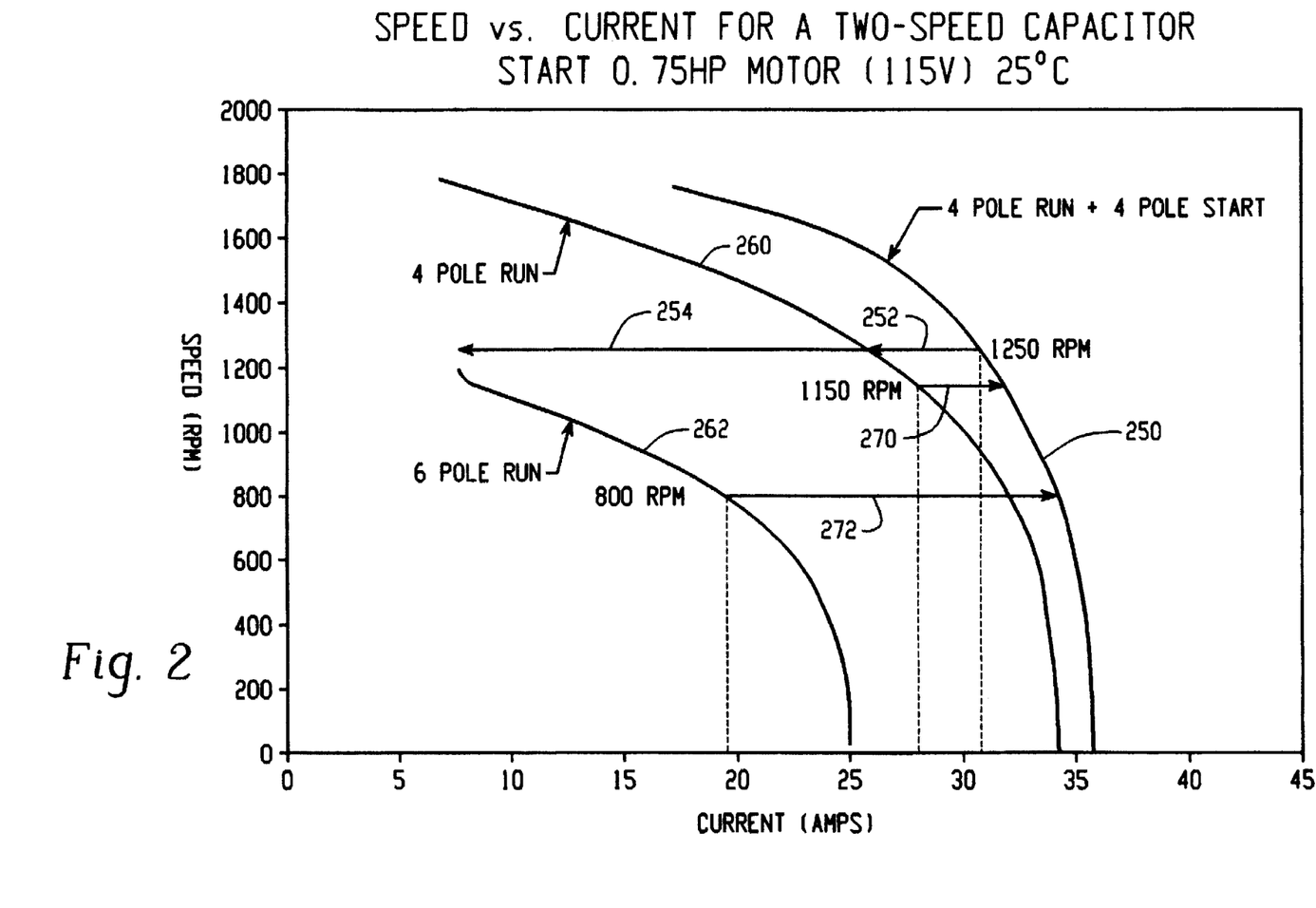
FIG. 2 is a graph showing motor current versus motor speed.
Figure 3:
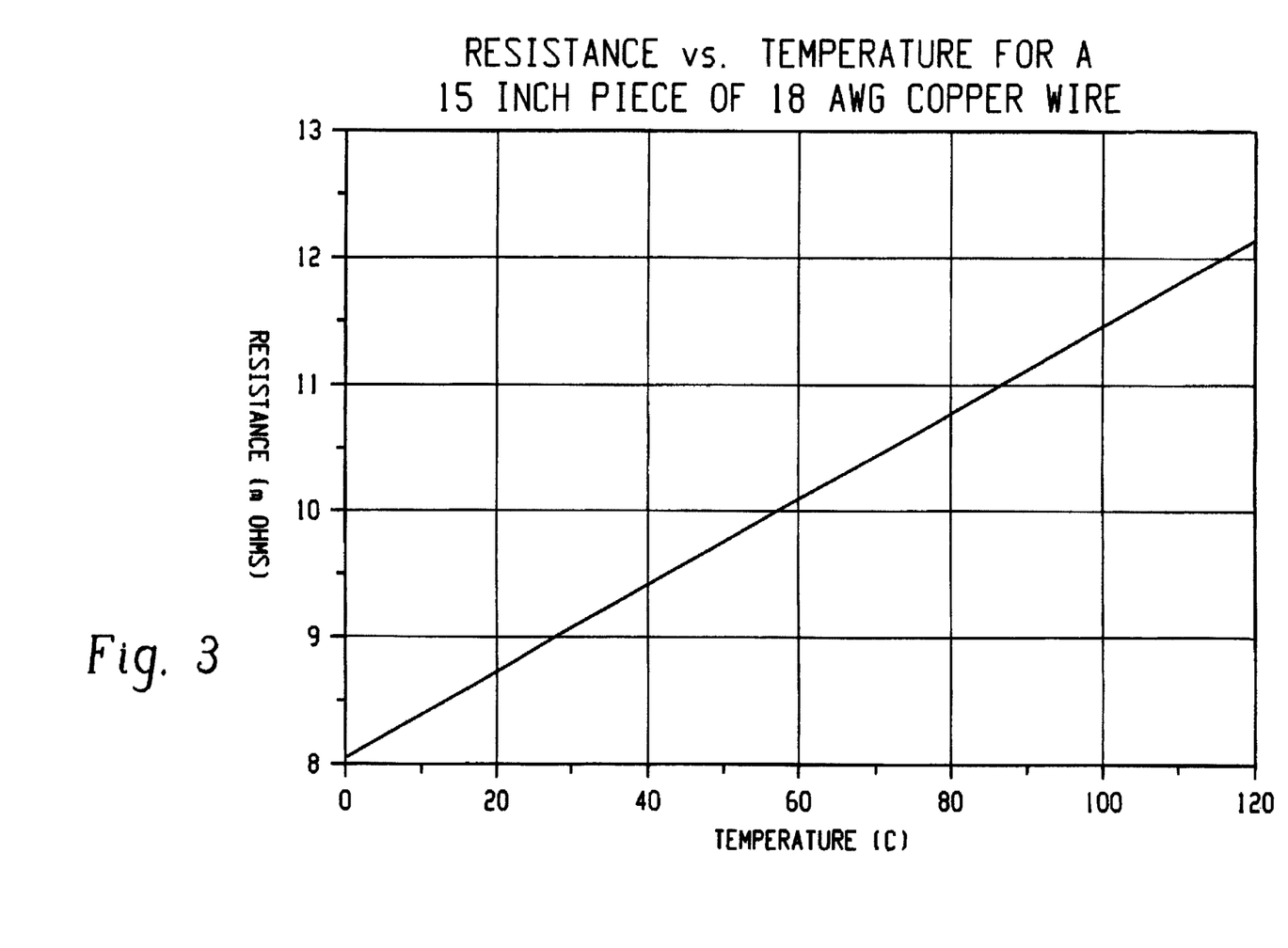
FIG. 3 is a graph showing resistance versus temperature for a sense resistor used in the control circuit of the present application.

A sense resistor 80 is connected in series with motor M in line 18. In one arrangement, the sense resistor is a short length of wire. A preferred example that has been tested is a 15-inch length of 18 gauge copper wire, with the wire gauge corresponding to American Wire Gauge Standards. The current running through motor M correlates to the rotational speed of the motor as shown in the graph of FIG. 2. The motor current also runs through sense resistor 80, and measuring the voltage drop across sense resistor 80 is a way of measuring motor current or a value that is correlated to motor current. Because the voltage drop correlates to motor current which in turn correlates to motor speed, the voltage drop also correlates to motor speed.

It will be recognized that the sense resistor could be of other metals, gauges and lengths, and that other kinds of sense resistors could be used. The sense resistor preferably is positioned inside the motor housing in close proximity to the motor windings for exposure to approximately the same temperature environment as the motor windings. However, it will be recognized that the sense resistor can be positioned in other locations, including outside of the motor housing, as long as the sense resistor is in approximately the same temperature environment as the motor and motor windings.

The motor current changes with variations in the temperature of the motor windings. However, motor current changes that are due solely to temperature variations do not appreciably affect motor speed. A control circuit that is sensitive to such changes in motor current could interpret them as motor speed changes and significantly contribute to inaccuracies in the motor rpm trip points at which the start winding is activated and deactivated.

The resistance of sense resistor 80 varies with temperature and is positioned for exposure to substantially the same temperature environment as the motor windings. This provides automatic compensation for current changes that are due to temperature variations because the current decreases with increasing resistance in accordance with Ohms law which states that V=IR, where V is the voltage, I is the current and R is the resistance. Therefore, the voltage drop across sense resistor 80 remains substantially constant with changes in motor current that are caused solely by temperature variations in the motor windings and that do not appreciably affect motor speed.

A line 84 connected at point 86 on the opposite side of sense resistor 80 from motor M terminates in an arrowhead 88 to designate a reference potential. All of the other arrowheads in the circuit of FIG. 1 are referenced to the same potential as arrowhead 88.

Line 6 is connected at point 90 between motor M and sense resistor 80, and to positive input 92 of operational amplifier 94 in amplifier E. The voltage across sense resistor 80 is amplified by amplifier E for conversion to a dc voltage. The input voltage at positive input 92 to operational amplifier 94 is a sine wave in the millivolt range and the output is a positive pulsating dc voltage in the single digit volt range. Amplifier E includes an impedance matching resistor 96, and resistors 98, 100 that set the amount of voltage gain provided by the amplifier.

A peak detector F is connected by line 102 to the output of amplifier E and converts the pulsating positive dc voltage from amplifier E to a steady dc voltage. The magnitude of the steady dc voltage is close to the peak of the pulsating dc voltage from amplifier E and correlates to the speed of motor M. Peak detector F includes a capacitor 104 that filters the positive pulsating dc voltage into a steady dc voltage, and a diode 106 prevents capacitor 104 from discharging back into amplifier E. Resistor 108 provides a controlled discharge path for capacitor 104, and zener diode 110 clamps the desired dc voltage value. Input impedance matching resistor 112 is in line 114 connecting the output of peak detector F to the positive input of comparator G.

The negative input of comparator G is connected by line 120 with voltage reference H that in turn is connected by line 122 to lines 1 and 2 through diodes 124, 126. Voltage reference H includes resistors 130, 132 that form a voltage divider for reducing the magnitude of line voltage to a reference voltage value. The reference voltage provided by voltage reference H to the negative input of comparator G varies in magnitude with variations in the magnitude of line voltage so that the ratio of the reference voltage to line voltage remains substantially constant. Variations in the magnitude of line voltage also cause changes in motor current and this in turn causes changes in the voltage drop across sense resistor 80 that are substantially proportional to the changes in the reference voltage. This provides the control circuit with automatic compensation for changes in motor current caused by line voltage variations because increases and decreases in the reference voltage are substantially matched by corresponding increases and decreases in the voltage drop across sense resistor 80. This improves the accuracy of the motor rpm trip points at which the start winding is deactivated and reactivated. The actual motor rpm trip points do not deviate by more than around plus or minus 150 rpm from the optimum motor rpm trip points.

Voltage reference H includes a diode 134 that rectifies the sine wave into a positive pulsating dc voltage. Capacitor 136 filters the positive pulsating dc voltage into a steady dc voltage, and resistor 138 provides a controlled discharge path for capacitor 136.

Adc power supply J connected to lines 1 and 2 converts ac line voltage to adc power supply for circuit components requiring adc voltage. Adc voltage 140 provided by dc power supply J is connected to other circuit components as indicated at 140a, 140b, 140c, 140d, 140e and 140f. Power supply J includes a diode 144 that rectifies line voltage into a positive pulsating dc voltage. Capacitor 146 filters the positive pulsating voltage into a steady dc voltage at 140, while zener diode 148 clamps the desired dc voltage value. A resistor 150 in series with diode 144 is a current limiting and voltage dropping resistor.

An inverter K is provided to invert the output of comparator G by use of an inverting comparator 152. Line 154 connects the output of comparator G to the negative input 156 of inverting comparator 152 through an impedance matching resistor 158.

Output line 160 from inverting comparator 152 is connected by line 162 to negative input line 120 of comparator G. Positive input line 164 of inverting comparator 152 includes a current limiting resistor 166 and an impedance matching resistor 168. Zener diode 170 clamps the positive input to a desired dc voltage value and sets the reference voltage for inverter K.

When the output of comparator G goes low, the connection through line 154 to the negative input at 156 of inverting comparator 152 drops below the regulated reference positive input at 164 and causes the output of inverting comparator 152 to go high. Capacitor 172 in line 162 provides hysteresis and pulls the negative input to comparator G higher when the output of inverter K goes high. This helps to prevent chattering of comparator G during switching, i.e., when comparator G changes between its high and low states. When the output of inverter K goes low, capacitor 172 pulls the negative input to comparator G lower and helps prevent chattering of comparator G when it changes to its opposite state.

A start winding gain adjuster P is provided for adjusting the gain of amplifier E when the start winding is inactive. When motor start winding 21 is active, there is a different correlation between motor current and motor speed compared to when start winding 21 is inactive as shown in the graph of FIG. 2. The purpose of gain adjuster P is to adjust the gain of amplifier E for achieving proper motor rpm and motor current switching points for activating and deactivating start winding 21.

When comparator G goes high to activate start winding 21, npn transistor 180 of gain adjuster P is off because the input voltage on line 154 to negative input 156 of inverting comparator 152 is higher than the reference voltage to positive input 164 and the output on line 160 goes low. Under these conditions, gain adjuster P is inoperative while start winding 21 is active so there is no adjustment in the gain of amplifier E.

The output of comparator G goes low to deactivate start winding 21, and the reference voltage on line 154 to negative input 156 of inverting comparator 152 is below the reference voltage at positive input 164. This causes the output of inverting comparator 152 to go high and turns on transistor 180 through current limiting resistor 184 connected with the base of the transistor. Resistor 182 of gain adjuster P is then connected in parallel with resistor 100 of amplifier E to provide a higher gain for amplifier E due to the relationship between resistors 100 and 182. When transistor 180 is off, resistor 182 has no effect on amplifier E.

A low speed run winding gain adjuster R is connected to the output of low speed detector D and the negative input 190 of operational amplifier 94. When electronic switch A is on for operating motor M on its low speed run winding 19, the relationship between motor current and motor speed changes as shown in FIG. 2. Gain adjuster R adjusts the gain of amplifier E when low speed run winding 24 is active to obtain proper motor rpm and motor current switching points. The switching points being the motor rotational speeds and motor currents at which the start winding is reactivated and deactivated.

When low speed electronic switch A is on with the speed selector switch in low speed position 14a for running motor M on low speed run winding 19, the voltage at positive input 50 of comparator 52 is larger than the reference voltage at negative input 54. Therefore, the output of comparator 52 on line 200 through current limiting resistor 202 goes high and turns npn transistor 204 on. This connects resistor 206 in parallel with resistor 100 in amplifier E to provide a higher voltage gain due to the relationship between resistors 100, 206.

When the motor speed selector switch is in solid line high speed position 14, or when low speed electronic switch A is off, low speed detector D detects a voltage less than 90 volts ac on the connection of line 7 to line 4. Therefore, the voltage at positive input 50 of comparator 52 is less than the reference voltage at negative input 54, and the output of comparator 52 goes low so that transistor 204 remains off and gain adjuster R has no effect on amplifier E when the low speed winding is inactive.

The output of comparator G goes high when the control circuit calls for activation of the start winding. Logic triac 46 of electronic start switch B is then turned on through the connection between lines 5 and 154 to comparator output line 26. When logic triac 46 turns on, this also turns on high current snubberless triac 47 to activate start winding 21.

The sensed value provided by the voltage drop across sense resistor 80 is constantly monitored, and amplifier E along with peak detector F provide a sensed value input to the positive input of comparator G. A reference value is provided to the negative input of comparator G from reference voltage H that monitors line voltage. When the positive input sensed value to comparator G from amplifier E and peak detector F is larger than the negative input reference value to comparator G from voltage reference H, the output of comparator G goes high and this turns on electronic start switch B to activate start winding 21.

The magnitude of the output from peak detector F correlates to motor current because the voltage drop across sense resistor 80 correlates to motor current which in turn correlates to motor speed as shown in FIG. 2. The magnitude of the reference voltage provided by voltage reference H to the negative input of comparator G correlates to the magnitude of line voltage. These relationships provide improved accuracy in the motor rpm trip points at which start winding 21 is reactivated or deactivated when changes in motor current are caused by line voltage variations.

When motor M is turned on with the motor speed selector switch in its solid line high speed position 14, the current running through high speed run winding 16 increases until the voltage drop across sense resistor 80 is sufficient for amplifier E and peak detector F to provide a positive input sensed value to comparator G that causes comparator G to go high. Electronic switch A is inactive because it has no power supply through line 2 when the motor speed selector switch is in its solid line high speed position 14. Comparator G going high also turns on electronic switch B to activate start winding 21. The motor then ramps up to speed with both high speed run winding 16 and start winding 21 active.

When comparator G goes high to activate the start winding, the output of inverter K goes low to turn gain adjuster P off so that the circuit automatically compensates for the higher motor current due to both high speed run winding 16 and start winding 21 being active. The current through high speed run winding 16 and start winding 21 decreases as the motor reaches its desired predetermined rotational speed. The sensed value provided by the voltage drop across sense resistor 80 also decreases with decreasing motor current until the positive input at 114 to comparator G from amplifier E and peak detector F falls below the reference voltage to negative input 120 of comparator G and causes the output of comparator G to go low. This turns off electronic switch B and deactivates start winding 21. This also causes the output of inverter K to go high and turns on gain adjuster P.

If the rotational speed of the motor slows down, the motor will draw more current and the voltage drop across sense resistor 80 will again increase until the positive input to comparator G from amplifier E and peak detector F is once more sufficient to turn on electronic start switch B for reactivating start winding 21.

When motor M is turned on with the motor speed selector switch in its low speed position 14a, the output of comparator G is low and electronic switch A is on to activate low speed run winding 19. Low speed detector D detects the voltage on line 4 through line 7 and the output of comparator 52 in detector D goes high to activate low speed gain adjuster R. At the same time, current through low speed run winding 19 and sense resistor 80 increase until the voltage drop across sense resistor 80 provides an input to comparator G from amplifier E and peak detector F to cause the output of comparator G to go high. Gain adjuster R adjusts the gain of amplifier E to account for different currents running through motor M depending upon whether high speed run winding 16 or low speed run winding 19 is active. Gain adjuster R is inactive when low speed run winding 19 is inactive.

With low speed run winding 19 active and the output of comparator G going high to activate start winding 21 through switch B, electronic switch A is turned off and high speed electronic switch C is on. This deactivates low speed run winding 19 and activates high speed run winding 16. Both gain adjusters P and R are turned off. The motor then ramps up to speed on high speed run winding 16 and start winding 21. When motor M reaches its desired predetermined rotational speed, the current running through the motor decreases until the voltage drop across sense resistor 80 is low enough to provide a positive input to comparator G from amplifier E and peak detector F that is less than the negative input from the voltage reference and causes the output of comparator G to go low. This turns on electronic switch A which then biases high speed electronic switch C off to reactivate low speed run winding 19 through switch A and deactivate high speed run winding 16. The output of comparator G going low also opens electronic switch B to deactivate start winding 42, and both gain adjusters P and R are turned on. The motor will then run on low speed run winding 19 alone unless the motor slows down sufficiently to provide a current through low speed run winding 19 and sense resistor 80 resulting in a voltage drop that drives the output of comparator G high.

The motor has three different operating conditions. The first condition is when both high speed run winding 16 and start winding 21 are active. In this condition, both gain adjusters P and R are inactive. This condition corresponds to curve 250 of FIG. 2 when the motor current is highest and the voltage drop across sense resistor 80 is largest. The second condition is when only the low speed run winding is active. In this condition, both gain adjusters P and R are active. This condition corresponds to curve 262 of FIG. 2 when the motor current is lowest and the voltage drop across sense resistor 80 is smallest. Under this condition, amplifier E is provided with the highest gain. The third condition is when only the high speed run winding is active. In this condition, gain adjuster P is active and gain adjuster R is inactive. Thus, amplifier E has less gain than in the second motor run condition. This third condition corresponds to curve 260 in FIG. 2 when the motor current is intermediate the motor current in the other two motor run conditions.

With reference to FIG. 2, when the motor is running on only the low speed run winding as represented by curve 262, both the low speed gain adjuster R and the start gain adjuster P are on to provide amplifier E with its greatest gain. When the motor is running on only the high speed run winding as represented by curve 260, low speed gain adjuster R is off and start gain adjuster P is on so that amplifier E has an intermediate gain. When the motor is running on both the start and high speed run windings as represented by curve 250, both of gain adjusters P and R are off and amplifier E has its lowest gain that is built into it with no boost from either gain adjuster P or R.

When the output of comparator G goes high, both start winding 21 and high speed run winding 16 are activated, low speed run winding 19 is deactivated and gain adjusters P and R are turned off. When the output of comparator G goes low, start winding 21 is deactivated, gain adjuster P is turned on and the motor continues to run on either high speed run winding 16 or low speed run winding 19 depending on the position of speed selector switch 14, 14a. Comparator G going low will turn on gain adjuster R if the speed selector switch is in position 14a for the low speed run winding, and will leave gain adjuster R off if the speed selector switch is in position 14 for the high speed run winding.

The output of comparator G goes high in response to higher motor currents running through sense resistor 80, and goes low in response to lower motor currents running through sense resistor 80.

With reference to FIG. 2, curve 250 shows the correlation between motor speed and motor current when both the start winding and the high speed run winding are active. At a motor speed of around 1,250 rpm, the start winding is deactivated and the motor current drops off as indicated by horizontal arrow lines 252, 254. The motor continues to run on only the high speed run winding represented by curve 260 or the low speed run winding represented by curve 262.

When the start winding is deactivated at a speed of around 1,250 rpm and the motor continues to run on only the high speed run winding, the motor speed continues to ramp up to an operating speed of around 1,600–1,800 rpm.

When the start winding is deactivated at a motor speed of around 1,250 rpm and the motor continues to run on only the low speed run winding, the motor speed ramps down slightly to an operating speed of around 1,000–1,200 rpm.

With the motor running on only the high speed run winding, a reduction in speed from the normal operating speed of around 1,600–1,800 rpm down to a reactivating speed of around 1,150 rpm will reactivate the start winding as depicted by horizontal arrow line 270 from curve 260 to curve 250 in FIG. 2.

With the motor running on only the low speed run winding at a normal operating speed of around 1,000–1,200 rpm, a reduction in speed down to a reactivating speed of around 800 rpm will reactivate the start winding as depicted by horizontal arrow line 272 from curve 262 to curve 250 in FIG. 2.

The different gain provided to amplifier E by gain adjuster P alone or by gain adjusters P and R combined makes it possible to reactivate the start winding at different motor speeds depending upon whether the motor is running on the high speed run winding or on the low speed run winding. It will be recognized that the trip points at which the start winding is activated and deactivated with reference to FIG. 2 are by way of example only and not by way of limitation. Many different trip points may be provided depending upon the application, and the trip points are approximate and may vary by at least plus or minus 150 rpm or even more.

Adjusting the gain of amplifier E provides an advantageous way of adjusting the motor speed trip points at which the start winding is deactivated and reactivated. The amplifier gain can be adjusted by changing the resistance value of resistors 100 and 182 in amplifier circuit E and gain adjuster circuit P. Adjusting the amplifier gain adjusts the magnitude of the difference between the sensed value across sense resistor 80 and the sensed value input that is received by comparator G. This functions to adjust the magnitude of the motor current at which comparator G will go high or low, thereby adjusting the motor speed at which the start winding is deactivated and reactivated. Increasing the amplifier gain provides upward adjustment in the motor speeds at which the start winding is deactivated and reactivated. Because of the inverse relationship between motor speed and motor current, this corresponds to downward adjustment in the magnitude of the motor currents at which the start winding is deactivated and reactivated. Decreasing the amplifier gain has the opposite effect. Changing the resistance value of resistor 206 in low speed gain adjuster H will further adjust the motor speed at which the start winding is activated when the motor is operating on only its low speed run winding. A change in resistor 206 that increases the gain of amplifier E will increase the motor speed and lower the motor current at which the start winding is activated when the motor is operating on only the low speed run winding. Once the start winding is activated, gain adjuster R is turned off. Because gain adjuster P is also on when the motor is operating on only its low speed run winding, changing resistor 182 also affects the motor speed at which the start winding will be activated when the motor is operating on only its low speed run winding.

The control circuit provides a start winding control that reactivates the start winding at different motor speeds depending upon whether the motor is connected through the speed selector switch for running on its low speed run winding or its high speed run winding. This is achieved by providing higher gain to the control amplifier when the motor is connected to run on its low speed run winding. The low speed gain is activated by a detector that detects when the low speed run winding is active.

The amplifier and peak detector effectively provide a sensing circuit for sensing a sensed value that correlates to motor current and providing a sensed value input to the comparator. The voltage reference provides a reference value to the comparator that correlates to line voltage for comparison with the sensed value to activate or deactivate the start winding.

The graph of FIG. 2 provides a reference for the motor currents at which the output of the comparator goes high or low to activate or deactivate the start winding. The comparator goes high at different motor currents that correlate to different reduced motor speeds depending on whether the high or low speed run winding is connected. This is because connection of the low speed winding activates a low speed gain adjuster for the amplifier.

With reference to the low speed curve 262, both the low speed gain adjuster and the start gain adjuster are active, and the output of the comparator will go high at any motor current greater than about 19 amps. This will deactivate the low speed winding, and turn off both the low speed gain adjuster and the start gain adjuster, while activating the start winding and the high speed winding, and the total motor current moves to curve 250.

With reference to high speed curve 260, gain adjuster P is on and gain adjuster R is off, and the output of the comparator will go high at any motor current greater than about 28 amps. This will activate the start winding and the total motor current moves to curve 250 while gain adjuster R remains off and gain adjuster P is turned off.

With both the start winding and the high speed winding connected as represented by curve 250, the output of the comparator is high and both the start gain adjuster P and low speed gain adjuster R are inactive so that the comparator output will go low at any motor current less than about 31 amps. This will deactivate the start winding and reactivate start gain adjuster P, and the total motor current decreases to either curve 260 or curve 262 depending on whether the speed selector switch is in its high or low speed position. If it is in the low speed position, low speed gain adjuster R will also be turned on.

Voltage reference H provides a reference value that correlates to line voltage and the voltage drop across sense resistor 80 provides a sensed value that correlates to motor current which in turn correlates to motor speed. The reference and sensed values provide reference and sensed inputs to comparator G.

Although a length of wire has been described for the sense resistor, it will be recognized that motor current can be sensed in other ways, such as by the use of a current transformer, a Hall effect sensor or other current sensing devices. It will also be appreciated by those skilled in the art that the triacs for the electronic switches could be replaced by solid state relays of either zero or non-zero crossing types. Instead of triacs or solid state relays, it is also possible to use zero crossing detectors or circuits. It will further be recognized that the discreet analog components shown and described could be replaced by, and incorporated in, an application specific integrated circuit. Obviously, the control circuit could also be a micro controller with appropriate associated software for performing the described control functions in response to sensed motor current.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. In a control circuit for a two speed electric motor having a start winding, a low speed run winding and a high speed run winding, a speed selector switch having high and low speed positions, a low speed electronic switch in series with said low speed run winding, a high speed electronic switch in series with said high speed run winding, and said high speed electronic switch being biased off when said low speed electronic switch is biased on.

2. The control circuit of claim 1 wherein said control circuit provides a control signal through said low speed electronic switch to said high speed electronic switch to bias said high speed electronic switch off when said low speed electronic switch is biased on.

3. The control circuit of claim 1 including a sensing circuit for sensing motor current to selectively activate or deactivate said start winding responsive to the magnitude of the motor current, said low speed electronic switch being biased off when said start winding is activated.

4. The control circuit of claim 1 including a start electronic switch in series with said start winding, said control circuit being operative to bias said low speed electronic switch off when said start electronic switch is biased on.

5. The control circuit of claim 1 wherein said low speed electronic switch includes an opto-isolator.

6. The control circuit of claim 1 wherein said high speed electronic switch is in series with said motor through said speed selector switch when said speed selector switch is in said low speed position, said high speed electronic switch being disconnected from said motor when said speed selector switch is in said high speed position.

7. The control circuit of claim 1 wherein said low speed run winding is activatable only through said low speed electronic switch when said speed selector switch is in said low speed position, said high speed run winding being activatable either directly through said speed selector switch in said high speed position thereof or through said high speed electronic switch when said speed selector switch is in said low speed position.

8. A control circuit for an electric motor having high and low speed run windings, a low speed electronic switch in series with said low speed run winding, a high speed electronic switch in series with said high speed run winding, and a connection between said high and low speed electronic switches to bias said high speed electronic switch off through said low speed electronic switch when said low speed electronic switch is on.

9. The circuit of claim 8 wherein said high speed electronic switch is on when said low speed electronic switch is off, a speed selector switch having high and low speed positions, and said high speed electronic switch being in series with said high speed run winding through said low speed position of said speed selector switch.

10. The circuit of claim 9 wherein said high speed electronic switch is disconnected from said high speed run winding in said high speed position of said speed selector switch.

* * * * *